United States Patent Office 2,711,397
Patented June 21, 1955

2,711,397

STABILIZED CREAM SHAMPOO

Emily M. Owen, West Orange, N. J., and Saul R. Buc, Easton, Pa., assignors to General Aniline & Film Corporation, New York, N. Y., a corporation of Delaware No Drawing. Application December 28, 1949,
Serial No. 135,538

3 Claims. (Cl. 252—152)

This invention relates to a process for inhibiting growth in moist cosmetic preparations and more particularly to a novel cream shampoo stabilized against bacterial growth.

Many cosmetic materials such as cream shampoos are subject to bacterial deterioration which may take many forms, the common one being the growth of visible, dark-colored colonies of micro-organisms, such as bacteria, molds, fungi, yeast and so forth. To control this form of deterioration, preserving materials must be added. Many of the commonly used preservatives are unsuitable for this use, such as mercurial salts which are potential skin irritants. Formaldehyde has an unsatisfactory odor, as do many other compounds, as for example the phenols and 8-hydroxyquinoline. Other preservatives which are otherwise suitable are too highly colored for incorporation in cosmetics of low coloration, for example, mercurochrome, gentian violet. These additives may also be used in other neutral or slightly alkaline cosmetic materials, such as wave-sets, tooth pastes, hair-cream oils, etc., all of which are subject to micro-biological attack. Many preservatives are not compatible with synthetic detergents. Many of the preservatives are incompatible with most shampoos as they are ordinarily composed either of soaps or of anionic detergents.

It has been discovered that bacterial growth in moist cosmetic preparations may be inhibited by a compound having the following general formula:

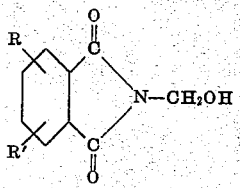

wherein R and R' are selected from the group consisting of hydrogen, bromine, chlorine, primary amino and nitro groups. In particular, it has been found that these compounds may be advantageously used together with an anionic detergent and soap in aqueous solution to form a stabilized cream shampoo.

We have found that cosmetic preparations such as cream shampoos, cream hair oils, hand lotions and the like can be protected against microbial attack by the addition of N-hydroxymethylphthalimide and derivatives thereof. Many of these preparations have a final pH of 7 or higher, making them susceptible to attack by bacteria. In addition, some are susceptible to molds. Several cosmetic compositions which may be protected include those disclosed in USP 2,460,776.

In addition to the preferable N-methylolphthalimide, the compounds having this activity include:

N-hydroxymethyl-3-methylphthalimide
N-hydroxymethyl-4-methylphthalimide
N-hydroxymethyl-4,5-dibromophthalimide
N-hydroxymethyl-4-chlorophthalimide
N-hydroxymethyl-3,4-dichlorophthalimide
N-hydroxymethyl-3-nitrophthalimide
N-hydroxymethyl-4-nitrophthalimide
N-hydroxymethyl-5-aminophthalimide
N-hydroxymethyl-6-aminophthalimide The following examples are illustrative of preferred embodiments of the invention but it will be understood that variations and substitutions may be made within the scope of the claims.

Example I 0.1% solution of the compound N-hydroxymethylphthalimide

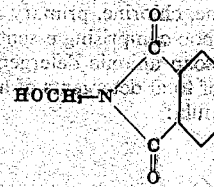

was prepared in 10% acetone and tested by means of a cup-plate test (Zinsser and Bayne-Jones, Textbook of Bacteriology (1939), 8th Edition, 6957, D. Appleton, Century Company) against *Escherichia coli* and *Staphylococcus aureus* and was found to give a 2.5 mm. halo against the former and a 5.0 mm. against the latter.

Example II

To a solution of 0.02 part by weight of N-hydroxymethylphthalimide in 1 cc. of acetone and 9 cc. water was added a solution of 0.1 part of green soap in 10 cc. of water, and this solution was used in the cup-plate test as described in Example I. A 1.0 mm. halo was obtained with *Escherichia coli* and there was some evidence of inhibition with *Staphylococcus aureus*.

Example III 0.1% of N-hydroxymethylphthalimide was added to tryptone phosphate broth containing 2% of sodium monoglyceride sulfate (marketed by Colgate-Palmolive-Peet under the trade-mark "Vel") and inoculated with *Alcaligenes viscosus* and whose growth was found to be inhibited. This medium is used in the laboratory for the culturing of *Alcaligenes viscosus*. This organism grows well in the media in which no N-hydroxymethylphthalimide is present.

Example IV

Using the slide germination technique described by S. E. A. McCallan et al. in "Contributions of the Boyce Thompson Institute" 4, 233 (1932); ibid. 9, 249 (1938); 10, 329 (1939); 12, 49 (1941); 12, 431 (1942), it was found that a 0.1 solution of N-(hydroxymethyl)phthalimide in 1 acetone completely inhibited the germination of *Sclerotinia fructicola* spores.

Example V 0.3% of N-hydroxymethylphthalimide was added to a cream-type shampoo of the following composition:

|  | Parts by weight |
| --- | --- |
| Glyceryl monostearate S | 10 |
| Polyglycol 400 monostearate | 20 |
| Lanolin | 10 |
| Duponol WA (sodium lauryl sulfate) | 40 |
| Sodium sulfate | 5 |
| Water | 106 |
| Perfume | 2 |

After several months' storage, there was no evidence of microbiological activity.

The amount of methylolphthalimide used may be varied widely but effective results are obtained in the range .01 to 0.1% by weight of the total detergents in the composition.

We claim:

1. A cream shampoo comprising essentially an aqueous emulsion of anionic detergent and a compound of the general formula:

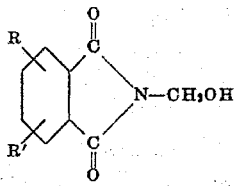

wherein R and R' are selected from the group consisting of hydrogen, bromine, chlorine, primary amino and nitro.

2. A cream shampoo comprising essentially an aqueous emulsion of a non-soap anionic detergent, and from .01 to 0.1% by weight of total detergents of a compound having the general formula:

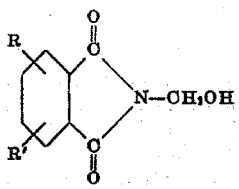

wherein R and R' are selected from the group consisting of hydrogen, bromine, chlorine, primary amino and nitro.

3. An improved cream shampoo comprising in parts by weight:

| | |
|---|---|
| Glyceryl monostearate | 10 |
| Polyglycol monostearate | 20 |
| Lanolin | 10 |
| Sodium lauryl sulfate | 40 |
| Sodium sulfate | 5 |
| Water | 106 |
| Perfume | 2 |
| N-hydroxymethylphthalimide | 0.6 |

References Cited in the file of this patent

UNITED STATES PATENTS

| | | |
|---|---|---|
| 1,990,676 | Stern | Feb. 12, 1935 |
| 2,361,322 | Schroy | Oct. 24, 1944 |
| 2,436,362 | Lacey | Feb. 17, 1948 |
| 2,490,459 | Lilienfeld | Dec. 6, 1949 |

OTHER REFERENCES

Sachs, Berichte der deutschen chemischen Gesellschaft, vol. 31, p. 1227.

Bennett, Chemical Formulary (1948), pp. 67, 68.